US006921996B2

(12) United States Patent
Parsoneault et al.

(10) Patent No.: US 6,921,996 B2
(45) Date of Patent: Jul. 26, 2005

(54) CONSTANT PRESSURE MAGNETICALLY PRELOADED FDB MOTOR

(75) Inventors: Norbert Steven Parsoneault, Scotts Valley, CA (US); Troy Michael Herndon, San Jose, CA (US); Jim-Po Wang, Pleasanton, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 301 days.

(21) Appl. No.: 10/264,228

(22) Filed: Oct. 2, 2002

(65) Prior Publication Data

US 2003/0174915 A1 Sep. 18, 2003

Related U.S. Application Data

(60) Provisional application No. 60/363,986, filed on Mar. 12, 2002, and provisional application No. 60/368,675, filed on Mar. 29, 2002.

(51) Int. Cl.[7] .............................................. H02K 7/08
(52) U.S. Cl. ........................................ 310/90; 310/67 R
(58) Field of Search ................................ 310/90, 67 R, 310/91

(56) References Cited

U.S. PATENT DOCUMENTS

| 5,533,814 | A |   | 7/1996  | Slocum ..................... 384/123 |
| 6,034,454 | A |   | 3/2000  | Ichiyama .................. 384/123 |
| 6,121,703 | A | * | 9/2000  | Kloeppel .................... 310/90 |
| 6,144,523 | A |   | 11/2000 | Murthy et al. |
| 6,208,050 | B1 | * | 3/2001 | Fujii ........................... 310/90 |
| 6,292,328 | B1 |   | 9/2001 | Rahman et al. |
| 6,307,291 | B1 | * | 10/2001 | Iwaki et al. ................. 310/90 |
| 2003/0020346 | A1 |   | 1/2003 | Ichiyama |

FOREIGN PATENT DOCUMENTS

JP          62037514         2/1987

* cited by examiner

Primary Examiner—Darren Schuberg
Assistant Examiner—Iraj A. Mohandesi
(74) Attorney, Agent, or Firm—Moser Patterson & Sheridan LLP

(57) ABSTRACT

The shaft may be supported for rotation by a conical bearing rotating within a sleeve. To prevent misalignment of the rotor and stator as the motor heats up and fluid viscosity changes, a magnetic preload is established; in a preferred embodiment, the magnetic preload is achieved using a magnetic back iron aligned with the stator magnet, the magnetic back iron being supported from the base. The shaft may further include a lower journal bearing for maintaining radial alignment and/or stiffness.

A shaft may be supported for rotation relative to a sleeve by a combination of journal bearing and thrust bearing whose gaps are connected and grooved to cooperate. The bearing system includes a magnetic preload at the end of the shaft distal from the journal bearing/thrust bearing combination, the magnetic force balancing the spiral groove thrust bearing to maintain the bearing support for the shaft and the load (including hub and disc) that it supports. Further, the journal bearing balances against the thrust bearing so that as fluid is drawn further into the thrust bearing, it is withdrawn from the journal bearing to reduce the working area of the journal bearing. A reservoir terminating in a capillary seal also provided on the far side of the thrust bearing from the journal bearing. This design allows the journal bearing to drain itself as the thrust bearing spins up and its pressure increases so that the pressure of the journal bearing matches the thrust bearing.

21 Claims, 4 Drawing Sheets

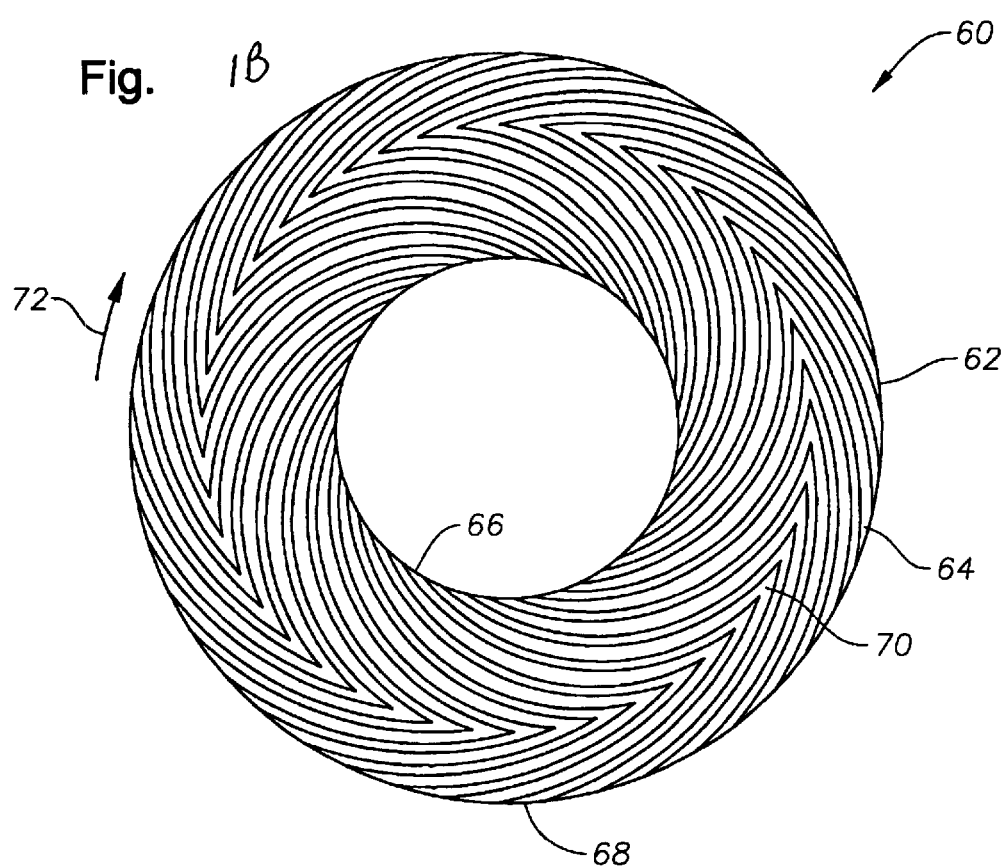

CONSTANT PRESSURE MAGNETICALLY PRELOADED FDB MOTOR

CROSS REFERENCE TO A RELATED APPLICATION

This application claims priority to two provisional applications, Ser. No. 60/363,986 filed Mar. 12, 2002, entitled CONSTANT PRESSURE MAGNETICALLY PRELOADED FDB MOTOR invented by Norbert Steven Parsoneault, Troy Michael Herndon and Jim-Po Wang, and provisional application Ser. No. 60/368,675, filed on Mar. 29, 2002, entitled CONSTANT PRESSURE CONICAL FDB invented by Norbert Steven Parsoneault and Troy Michael Herndon and incorporated herein by reference.

FIELD OF THE INVENTION

The present invention relates to the field of fluid dynamic bearings, and more particularly to fluid bearings which are less temperature dependent.

BACKGROUND OF THE INVENTION

Disc drive memory systems have been used in computers for many years for storage of digital information. Information is recorded on concentric tracks of a magnetic disc medium, the actual information being stored in the forward magnetic transitions within the medium. The discs themselves are rotatably mounted on a spindle, while the information is accessed by read/write has generally located on a pivoting arm which moves radially over the surface of the rotating disc. The read/write heads or transducers must be accurately aligned with the storage tracks on the disk to ensure proper reading and writing of information.

During operation, the discs are rotated at very high speeds within an enclosed housing using an electric motor generally located inside the hub or below the discs. Such known spindle motors typically have had a spindle mounted by two ball bearing systems to a motor shaft disposed in the center of the hub. The bearings are spaced apart, with one located near the top of the spindle and the other spaced a distance away. These bearings allow support the spindle or hub about the shaft, and allow for a stable rotational relative movement between the shaft and the spindle or hub while maintaining accurate alignment of the spindle and shaft. The bearings themselves are normally lubricated by highly refined grease or oil.

The conventional ball bearing system described above is prone to several shortcomings. First is the problem of vibration generated by the balls rolling on the bearing raceways. This is one of the conditions that generally guarantee physical contact between raceways and balls, in spite of the lubrication provided by the bearing oil or grease. Hence, bearing balls running on the generally even and smooth, but microscopically uneven and rough raceways, transmit the rough surface structure as well as their imperfections in sphericity in the vibration of the rotating disc. This vibration results in misalignment between the data tracks and the read/write transducer. This source of vibration limits the data track density and the overall performance of the disc drive system. Vibration results in misalignment between the data tracks and the read/write transducer. Vibration also limits the data track density and the overall performance of the disc drive system.

Further, mechanical bearings are not always scalable to smaller dimensions. This is a significant drawback, since the tendency in the disc drive industry has been to continually shrink the physical dimensions of the disc drive unit.

As an alternative to conventional ball bearing spindle systems, much effort has been focused on developing a fluid dynamic bearing. In these types of systems lubricating fluid, either gas or liquid, functions as the actual bearing surface between a shaft and a sleeve or hub. Liquid lubricants comprising oil, more complex fluids, or other lubricants have been utilized in such fluid dynamic bearings. The reason for the popularity of the use of such fluids is the elimination of the vibrations caused by mechanical contact in a ball bearing system, and the ability to scale the fluid dynamic bearing to smaller and smaller sizes.

In such designs, the changing viscosity of the fluid with operating temperature of the bearing and or motor is a significant restraint on available designs. Thus, as the temperature changes, the power required to spin the motor will vary, if the gap remains constant; further, the stiffness of the system will diminish as the system heats and fluid viscosity diminishes.

Past efforts to address this problem have included using different metals in the shaft and sleeve so that the gap would change with changes in temperature; however, such solutions are typically relatively expensive. Accordingly, it would be advantageous to design a fluid bearing which minimizes the power required at start-up and constant speed rotation even as the viscosity of the fluid undergoes substantial changes.

SUMMARY OF THE INVENTION

The present invention is intended to provide a fluid dynamic bearing assembly especially useful in a high speed spindle motor assembly.

More particularly, the present invention is intended to provide a fluid bearing assembly in which the temperature influence on power requirements, and stiffness, is diminished.

These and other advantages and objectives are achieved by providing a fluid bearing design wherein a fluid bearing supports the shaft for rotation, with its positioning being axially compensated by a magnetic preload. By this combination, as the motor speeds up and heats up, which would otherwise cause the fluid pressure in gap to change, the magnetic preload maintains the pressure in the fluid between relatively rotating rotor and stator.

The shaft may be supported for rotation by a conical bearing rotating within a sleeve. To prevent misalignment of the rotor and stator as the motor heats up and fluid viscosity changes, a magnetic preload is established; in a preferred embodiment, the magnetic preload is achieved using a magnetic back iron aligned with the stator magnet, the magnetic back iron being supported from the base. The shaft may further include a lower journal bearing for maintaining radial alignment and/or stiffness.

A shaft may be supported for rotation relative to a sleeve by a combination of journal bearing and thrust bearing whose gaps are connected and grooved to cooperate. The bearing system includes a magnetic preload at the end of the shaft distal from the journal bearing/thrust bearing combination, the magnetic force balancing the spiral groove thrust bearing to maintain the bearing support for the shaft and the load (including hub and disc) that it supports. Further, the journal bearing balances against the thrust bearing so that as fluid is drawn further into the thrust bearing, it is withdrawn from the journal bearing to reduce the working area of the journal bearing. A reservoir terminating in a capillary seal also provided on the far side of the thrust bearing from the journal bearing. This design allows the journal bearing to drain itself as the thrust bearing spins up and its pressure increases so that the pressure of the journal bearing matches the thrust bearing.

In sum, according to the present arrangement, as the temperature changes, the viscosity of the fluid in the bearing gap will change; due to the effect of the magnetic bias, the thrust gap will change and the pressure will remain constant maintaining system stiffness. Further, as the viscosity changes the journal length the effective length of the journal bearing will change so that the two bearings, the journal bearing and the thrust bearing remain in balance.

It can further be seen that the design will be relatively easy to assemble requiring simply an injection of oil into the hub to fill the single gap between the hub/shaft combination and the sleeve.

BRIEF DESCRIPTION OF THE DRAWINGS

For a fuller understanding of the present invention, reference is made to the accompanying drawings in the following detailed description wherein

FIG. 1 is a vertical sectional view of an exemplary embodiment of a disc drive motor incorporating a fluid dynamic bearing;

FIG. 1B is a plan view of a typical grooving pattern used in a fluid dynamic bearing such as shown in FIG. 1;

DETAILED DESCRIPTION OF THE PREFERRED EMBODIMENTS

Reference will now be made in detail to exemplary embodiments of the invention, examples of which are illustrated in the accompanying drawings. While the invention will be described in conjunction with these embodiments, it is to be understood that the described embodiments are not intended to limit the invention solely and specifically to only those embodiments, or to use solely in the disc drive which is illustrated. On the contrary, the invention is intended to cover alternatives, modifications and equivalents which may be included within the spirit and scope of the invention as defined by the attached claims. Further, both hard disc drives, in which the present invention is especially useful, and spindle motors, where the invention is also especially useful are both well known to those of skill in this field. In order to avoid confusion while enabling those skilled in the art to practice the claimed invention, this specification omits such details with respect to known items.

Figure 1:
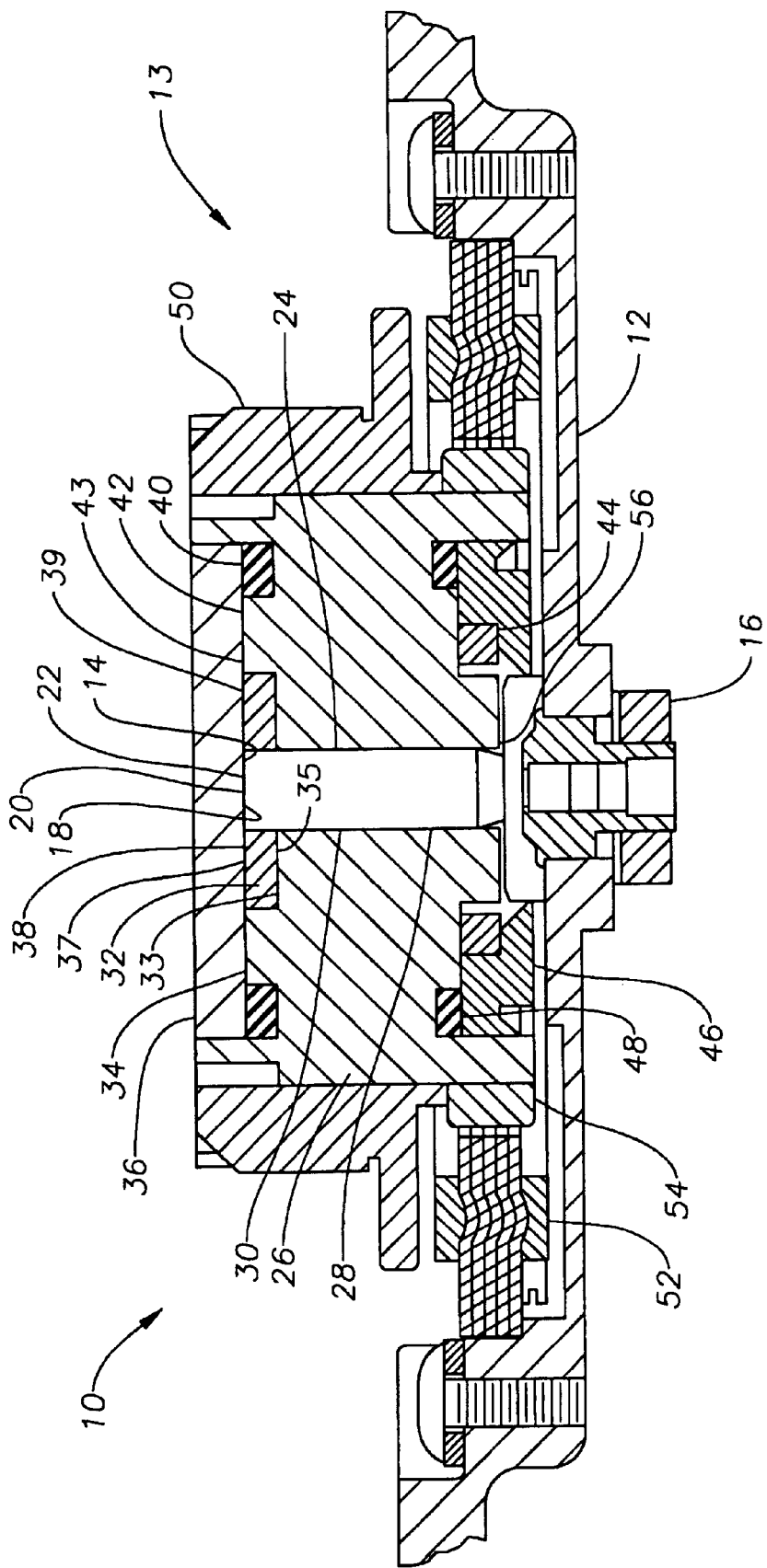
FIG. 1 is an elevation view and cross section of a computer hard disc drive spindle motor assembly taken along the axis of rotation of the spindle motor assembly.

FIG. 1 is a cross section through one embodiment of a spindle motor assembly which may readily be adapted to incorporate a fluid dynamic bearing arrangement according to the present invention. More specifically, the spindle motor shown in FIG. 1 is of a fixed shaft design; whereas FIGS. 2A, 2B, & 3A which are used to further illustrate the present invention are of a rotating shaft design. It will be apparent to a person of skill in the art that the present invention is useful with both either a fixed shaft or a rotating shaft design.

FIG. 1 illustrates a cross section through one embodiment of a spindle motor which may be adapted to incorporate a fluid dynamic arrangement according to the invention. The spindle motor assembly comprises a base 12 and a hub assembly 13. A shaft 14 is mounted to the base 12 by a nut 16.

The outer surface of the shaft 14 and the adjacent bore of the journal sleeve 26 together form hydrodynamic journal bearings 28, 30. The dual reference numbers are used because the journal bearings are typically in two sections. The bearing gaps at the hydrodynamic journal bearings, 28, 30 are typically between 0.003 and 0.006. The journal bearings 28, 30 each include a grooved surface. The grooved surfaces may be provided either on the outer surface of the shaft 14, or the inner bore surface of the journal sleeve 26.

A thrust plate 32 is press fitted or formed or otherwise attached to an end of the shaft 14 and extends transversely to the shaft 14. The thrust plate 32 is circular in form; the thrust plate 32 defines a first axial thrust surface 33 which, together with a facing sleeve thrust surface 35 extending transverse to the journal bearing defines a first fluid dynamic thrust bearing 34 in the gap between the two surfaces. As can be seen from FIG. 1, the disc thrust surface 35 at bearing 34 extends transversely to the journal at 30, and the thrust bearing gap is connected to that journal bore.

A counterplate 36 is press fitted to or otherwise supported by the journal sleeve 26 adjacent the thrust plate surface 37 which is distal from the journal bearing 28, 30. The counterplate 36 has a surface 39 which cooperates with the thrust plate surface 37 to define a gap in which fluid is maintained during rotational operation of the shaft and sleeve. Therefore, the counterplate 36 is sealed to the journal sleeve 26 by a O-ring 40 or similar means to prevent any loss of the fluid which appears in the gap between counterplate and thrust plate.

In use, the hub assembly 13 is rotated with respect to the base 12 by means of an electromagnetic motor. The electromagnet motor comprises a stator assembly 52 mounted to the base 2, and a magnet 54 mounted to the journal sleeve 26.

As can be appreciated from FIG. 1, the hub assembly 13, which generally comprises the journal sleeve 26, hub sleeve 50, counterplate 36, and first and second porous lubricant reservoirs 42 and 44, is supported for rotation relative to the base 12 and shaft 14 on hydrodynamic bearings 28, 30, 34, and 38.

The operation of a hydrodynamic bearing can best be understood by reference to FIG. 1B, which illustrates a plan view of one of the surfaces of a hydrodynamic thrust bearing. The illustrated hydrodynamic bearing surface, generally indicated by the numeral 60, comprises a series of alternating grooves 62 and lands 64. Each groove 62 comprises a leg which extends outward from the inner radius 66 of the hydrodynamic bearing surface 60 and a leg which extends inward from the outer radius 68 of the hydrodynamic bearing surface 60. The two legs end in a point at an intermediate radius 70. The plurality of grooves 62 and lands 64 together form a curved herringbone pattern as illustrated in the figure.

A hydrodynamic thrust bearing is formed when the bearing surface 60 is placed adjacent to an opposed bearing surface with a film of lubricant between the two surfaces. When the bearing surface 60 is rotated in the direction 72, that is against the herringbone pattern, the grooves 62 and lands 64 tend to draw lubricant from the inner and outer radii 66 and 68 towards the points of the herringbone pattern at

70. This creates a radial pressure distribution within the lubricant which serves to keep the bearing surfaces apart under external loading.

By varying the pattern of grooves 62 and the lands 64 in a known fashion, the pressure distribution across the hydrodynamic bearing can be varied. In particular, if the pressure in the bearing lubricant is greater at the inner radius 66 than at the outer radius 68 during operation, a net flow of lubricant from the inner radius 66 to the outer radius 68 will result, and vice versa. This can be done, for example, by having the intermediate radius 70, at which the points of the herringbone pattern are located, closer to the outer radius 68. Other ways in which the pressure distribution across the hydrodynamic bearing can be varied include altering the depth or width of the grooves, the number of grooves, or the angle the grooves make with a radial axis. The significance of having a net flow of lubricant across the bearing surface is discussed below.

The grooves 62 and 64 may be formed in the hydrodynamic bearing surface by any number of means including, for example, electroforming or stamping.

Although the operation of a hydrodynamic bearing has been discussed with reference to a hydrodynamic thrust bearing, it will be appreciated that the above principles can be applied to a hydrodynamic journal bearing such as the hydrodynamic journal bearings 28 and 30 illustrated in FIG. 1. In particular, the pattern of the grooves and lands of the hydrodynamic journal bearings 28, 30 can be arranged to create a net flow of lubricant in a direction along the longitudinal axis of the shaft 14, i.e. towards or away from the base 12; in this case it is toward the thrust bearing.

It will also be appreciated that a hydrodynamic bearing is not limited to the use of a herringbone pattern of grooves 62 and lands 64. For example, a spiral or sinusoidal pattern may be used as an alternative to the herringbone pattern. The herringbone pattern is however preferred for thrust bearing arrangements as it generates a pressure distribution across the bearing surface which provides improved bearing rocking stiffness. Bearing rocking stiffness is a measure of the ability of a thrust bearing to resist rotation of the bearing surfaces relative to one another about an axis trasverse to the axis of rotation of the thrust bearing.

Figure 2A:
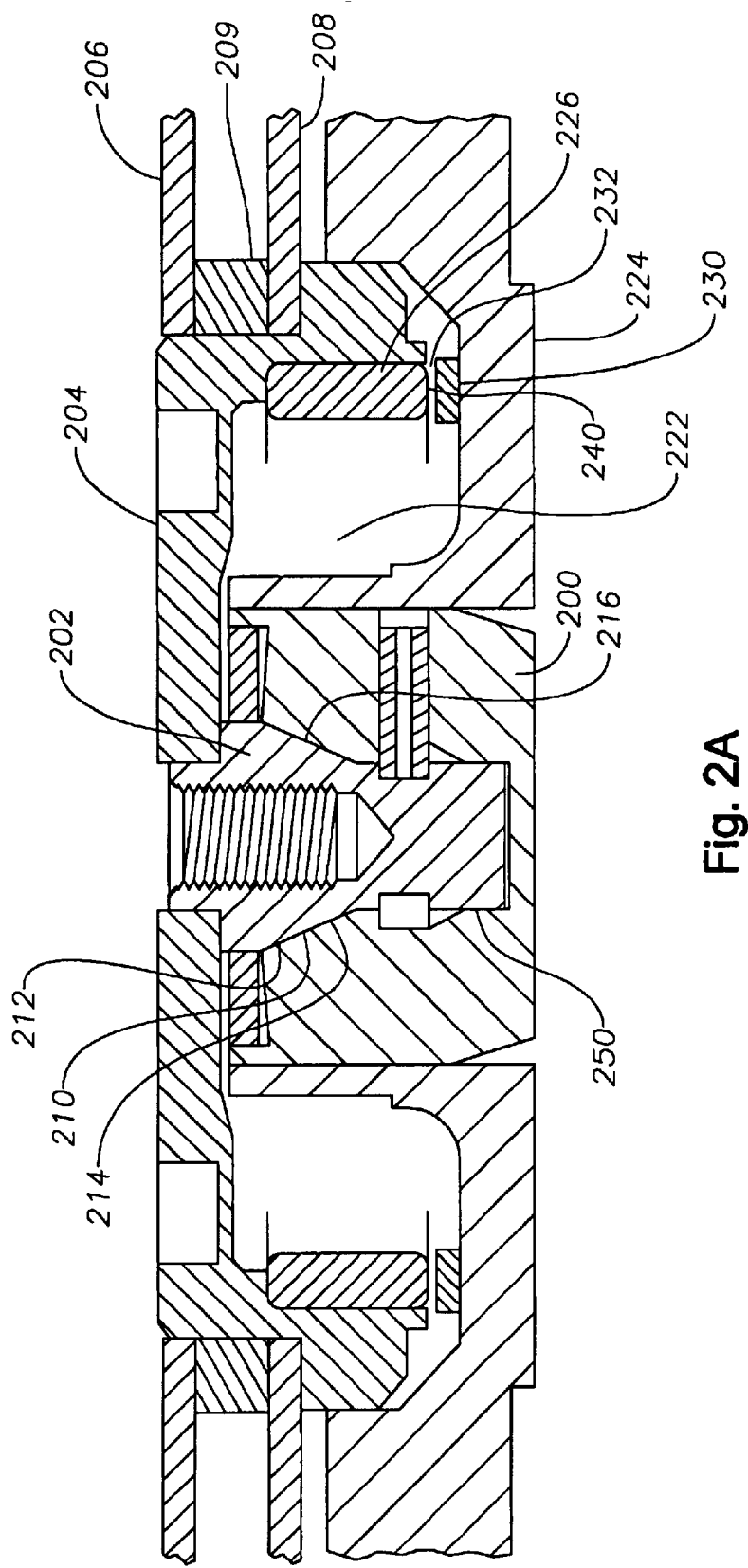
FIG. 2A is a vertical sectional view of a constant pressure magnetically preload fluid dynamic bearing of a type incorporating the present invention.
Figure 2B:
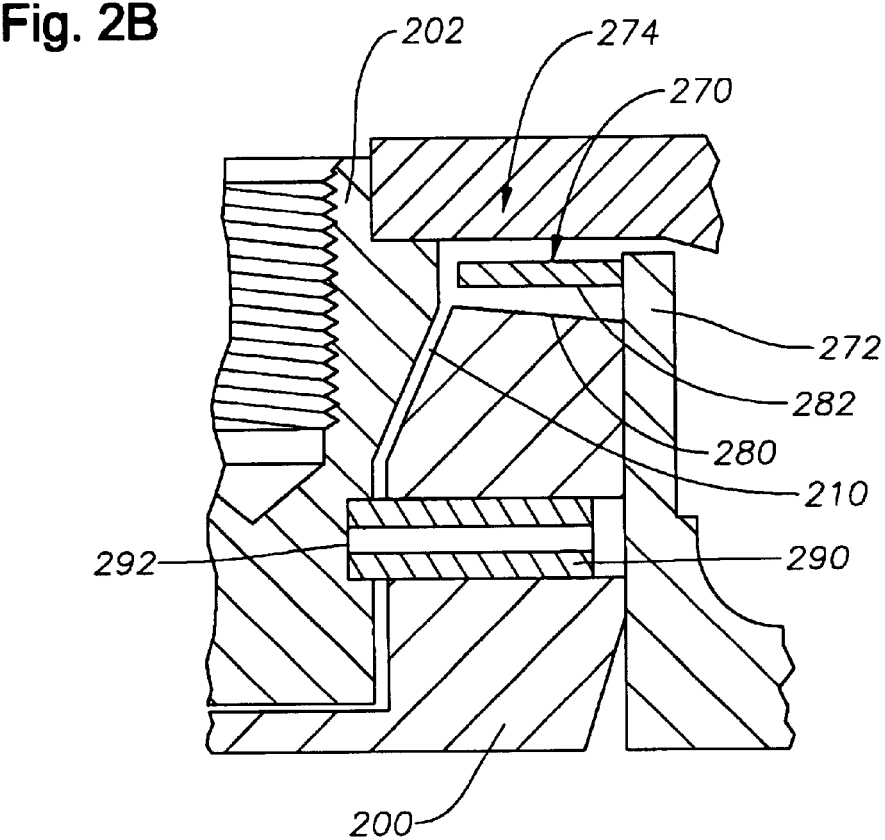
FIG. 2B is an expanded view of a section of the preferred embodiment of FIG. 2A.
Figure 3:
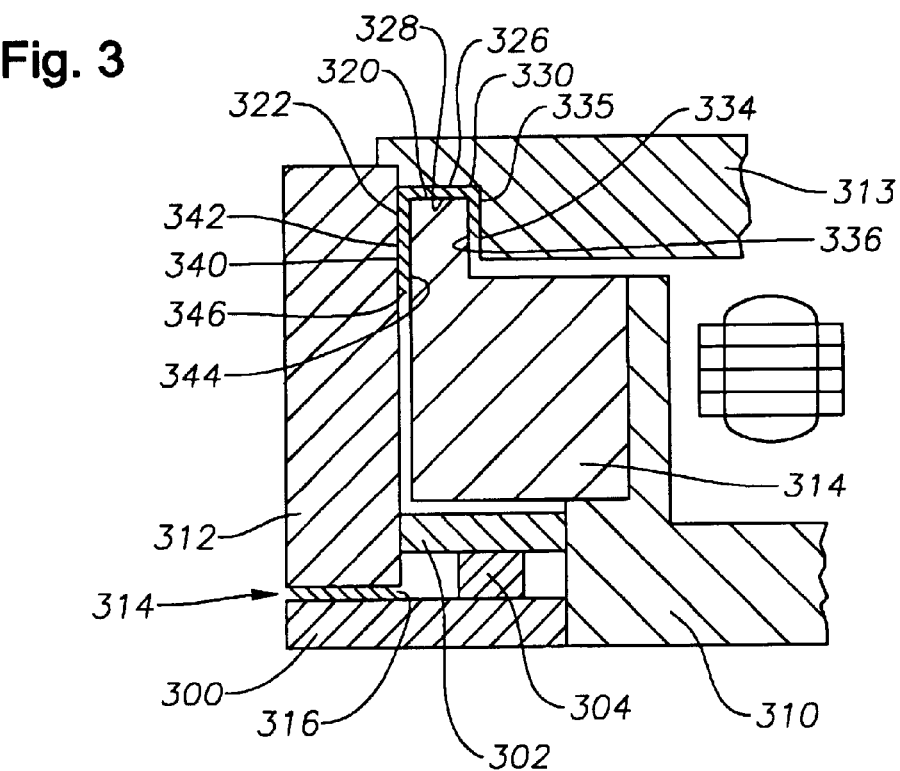
FIG. 3 is a vertical sectional view of an alternative embodiment to the magnetically compensated constant pressure fluid dynamic bearing shown in FIG. 2A.

Referring again to FIG. 1, in use the hub assembly 13 (generally comprising the journal sleeve 26, counterplate 36, and the hub sleeve 50, although it may include the hub and the shaft in embodiments such as shown in FIGS. 2A, 2B and 3A) is rotated relative to the base 12 by means of an electromagnetic motor comprising stator assembly 52 and magnet 54. The hub assembly is supported for smooth rotation on the shaft 14 and thrust plate 32 by the pressures generated in the lubricant at the hydrodynamic bearings 28, 30, 34 and 38.

The embodiments of the present invention are intended to minimize power consumption and maintain stability of the rotating hub. The problem is complicated by the fact that the relative rotation of the hub sleeve shaft combinations is typically supported by fluid whose viscosity changes with temperature. Moreover, the power consumption also changes with the change in viscosity of the fluid. At low temperature the viscosity is high and the power consumption is also relatively high. The larger the grooved areas, the greater the power consumption. The power consumption and also stiffness change with the width of the gap in which the bearing is established. In the typical designs as exemplified in FIG. 1, the gap is constant, and therefore the power consumption and stiffness vary as the viscosity of the fluid changes.

FIG. 2A shows a fluid bearing comprising a sleeve 200 and a shaft 202 supporting a hub 204 for rotation in which the design is modified to maintain stiffness with changes in viscosity. The hub supports one or more discs 206, 208. The design includes a conical fluid dynamic bearing 210 comprising a gap between the outer surface 212 of shaft 202 and the inner surface 214 of sleeve 200. One of those two surfaces has grooves to maintain the pressure of a fluid 216 maintained in this gap to support the relative rotation of the shaft and sleeve.

The design shown includes a stator 222 supported on the outer surface of the base 224, and cooperating with magnet 226 so that appropriate energization of the stator causes high speed rotation of the hub 204 and therefore the discs 206, 208. A biasing magnet or magnet preload 230 is mounted on an axially facing surface of the disc base 224 and across a gap 232 from the magnet 226 which is used to drive the motor rotation. This is the simplest approach to establishing a constant magnetic axial bias against the shaft, to axially position the shaft 202 relative to the sleeve; of course a separate magnet which is not the magnet incorporated in the motor could also be used.

The magnet 226 is of course primarily in plane to interact with the stator 222 to drive the motor in constant speed rotation. However, there is also magnetic flux which leaks out of the base region 240 of the magnet 222 and interacts with the magnetic keeper or back iron 230 across the gap 232. This force can be calibrated against the axial force established across the gap 210 of the fluid bearing between shaft 202 and sleeve 200. Once this force is established, as the temperature changes, and the viscosity of the fluid changes, the fluid bearing gap will adjust so that the axial force across the gap remains substantially stable with changes in temperature. Further, with the use of the conical design, which provides both axial and radial support for the relatively rotating parts, good misalignment stiffness is established. It should be noted as to the magnet 226 that no major modifications to the motor magnet are required to implement this invention. It will be necessary to calibrate the gap 232 to establish the force across the gap relative to the desired force which is needed to establish and maintain the pressure in the gap 210 with changes in temperature of the fluid so that the fluid bearing is properly temperature compensated.

To reproduce the motor in high volume production, the gap should be set accurately so that by utilizing magnet 226 cooperating with back iron 230 of constant size separated by a constant gap, a constant force can be established; this force will establish the parameters for the rest of the motor so that a constant force is established across the bearing gap.

It should be noted that in this particular embodiment, a further fluid bearing 250 is defined between the outer surface of the shaft 202 and the inner surface of the sleeve 200. This bearing is defined using well established technology, imposing grooves on either the outer surface of the shaft or the 202 or the inner surface of sleeve 200 with fluid in the gap supporting the relative rotation of the shaft and sleeve.

As shown in greater detail in FIG. 2B, two other features need to be considered. To maintain the fluid in the gap 210 of the conical bearing, a radial capillary seal 270 is incorporated into the design. According to this feature, the sleeve 200 either incorporates or has integrated therewith or attached thereto a vertical arm 272 which has a shoulder 274 extending radially toward the shaft 202. The sleeve itself further incorporates a slanted surface 280 which diverges slightly from the shoulder 274. The angular surface 280 and the facing lower surface 282 of shoulder 274 together define an opening which is connected to the upper end of the gap 210 between sleeve 200 and shaft 202. As the sleeve 202 rotates relative to the sleeve 200 and the shoulder 274, any excessive fluid is thrown into this diverging gap where it is trapped so that the fluid cannot escape to the region outside the fluid bearing which incorporates gap 210. This radial capillary seal 270 also functions as a reservoir so that fluid is always available for the conical bearing. A similar capillary seal may also be incorporated into the design adjacent the end of the journal bearing.

It should further be noted that a pin or the like 290 is impressed though an opening in the sleeve 200 so that it fits into a recess 292 which is defined in the outer surface of the shaft 202. This recess 292 is a groove which extends all the way around the outer surface of the sleeve so that the shaft 202 may rotate past the sleeve and past the pin 290; however, the pin 290 will prevent axial separation or undue axial movement of the shaft 202 and sleeve 200.

It should be noted that the spring pin is essentially a rolled piece of metal which can be inserted in the opening and then allowed to spring back against the sides of the opening thereby capturing the shaft relative to the sleeve.

Other features and advantages of the invention will become apparent to a person of skill in the art who studies the following disclosure of preferred embodiments.

Referring next to FIG. 3A, we see a vertical sectional partial view of a alternative embodiment of a compensated constant pressure fluid bearing design. In this design, shaft 312 is supported for rotation relative to the sleeve 314, and supports in turn a hub and one or more discs. A magnetic circuit comprising a pair of magnetic keepers 300, 302 and an intervening magnet 304 are supported from the base 310 adjacent the shaft 312. A magnetic gap is established between the magnetic keeper 300 and the base of the shaft 312 which will create a magnetic preload axially along the shaft 312 tending to pull it toward the base. In a potential alternative, a ferro fluid 314 to enhance the magnetic circuit may be incorporated in the gap 316 between the magnetic keeper 300 and the base of the shaft 312 which is of a magnetic material. This magnetic preload, established across the gap 316, with or without a ferro fluid incorporated therein, is balanced against the rotation supporting pressure of a combined thrust bearing 320 and journal bearing 322. This magnetic bias is provided, to provide an offset and bias against the temperature dependent pressure variations of a combined journal bearing 322 and thrust bearing 320 which are in fluid communication to support rotation of the shaft 312 and hub 313. The thrust bearing is defined by surfaces 326 and 328 which define a gap 330 in which fluid is maintained and pressurized by grooves on one of the two surfaces 326, 328. The fluid is maintained in this gap in part by a reservoir and capillary seal which is defined adjacent to the thrust bearing. This reservoir 337 and capillary seal 339 are defined by surfaces 335, 336 which establish a gap 334 with diverging walls, the gap being adjacent to and parallel to the journal bearing 322. The journal bearing 322 is defined by wall surfaces 340, 342, 344 which establish a gap 340. Fluid 346 is maintained in this gap and pressurized therein by rotation of the sleeve which is supported from the base and the shaft 312 which rotates with hub 313.

As described with the previous embodiment, the magnetic force across the gap 316 is primarily balanced against the pressure established in the thrust bearing at gap 330; as the viscosity changes, with temperature, the pressure across the gap is maintained by the fact that the shaft can adjust its position axially under the influence of the magnetic field so that the gap 330 pressure is reliably maintained to support rotation of the shaft and hub. The journal bearing established in the gap 340 is biased (by appropriate design of the groove pattern or the like) to pump toward the thrust bearing 330. As the viscosity changes, the journal bearing will pump fluid toward the thrust bearing to maintain fluid therein; further, the groove pattern on the journal bearing is set to have a length such that the effectiveness of this journal bearing is diminished as fluid is pumped up toward and into the thrust bearing; this can occur because as fluid is pumped toward the thrust bearing, some portion of the journal bearing gap will have little or no fluid. The provision of a reservoir in the gap 335 which ends in the capillary seal 334 allows the journal bearing to balance against the thrust bearing; the reservoir which is on the far side of the thrust bearing but fluidly connected thereto from the journal bearing allows the journal bearing to drain itself until the pressure of the journal bearing matches that of the thrust bearing, with both of these bearings being balanced against to the magnetic bearing and the force which it establishes to maintain shaft stiffness.

What is claimed is:

1. A fluid dynamic bearing comprising a sleeve, a shaft supported for rotation within the sleeve, the shaft supporting at one end a hub for rotation with the shaft, a stator supported on an outer surface of the sleeve, and radially aligned with a magnet supported on an inner surface of the hub, a base supporting the sleeve, and further supporting a magnetic preload device aligned with the magnet, the shaft having an outer surface having a generally conical shape and facing an inner surface of the sleeve, one of the shaft and sleeve having a set of grooves defined thereon, the shaft being supported for rotation relative to the sleeve by fluid in a gap between the shaft and the sleeve, the shaft being axially biased by the magnetic preload cooperating with the motor magnet.

2. A bearing as claimed as claim 1 wherein the magnetic preload is set to impose a constant load on the conical bearing to compensate for the changing viscosity of the fluid in the gap between the conical bearing and the sleeve.

3. A bearing as claimed in claim 1 wherein the shaft and sleeve further define a journal bearing, the journal bearing being defined by a set of grooves on one of the outer surface of the shaft or the inner surface of the sleeve and including fluid in a gap defined by an outer surface of the shaft and an inner surface of the sleeve.

4. A bearing as claimed in claim 2 including a seal at either end of the conical bearing to maintain fluid in the conical bearing.

5. A bearing as claimed in claim 2 further comprising a pin extending at least partially through the sleeve and cooperating with a recess in an outer surface of the shaft located between the conical bearing and the journal bearing to prevent excessive axial motion of the shaft relative to the sleeve.

6. A bearing as claimed in claim 1 wherein a gap between the magnetic preload device and the motor magnet is set to establish a substantially constant axial pressure in the conical bearing over changes in temperature.

7. A constant load fluid dynamic bearing comprising a sleeve, a shaft supported for rotation within the sleeve, the shaft supporting at one end a hub for rotation with the shaft, a stator supported on an outer surface of the sleeve, a base supporting the sleeve, and further supporting a magnetic preload device aligned with the magnet, the shaft having an outer surface facing an inner surface of the sleeve, one of the shaft and sleeve having a set of grooves defined thereon, the shaft being supported for rotation relative to the sleeve by a fluid dynamic bearing system comprising fluid in a gap between the shaft and the sleeve and the hub and the sleeve, the shaft being axially biased by a magnetic preload system cooperating with an end of the shaft distal from the fluid bearing system.

8. A bearing as claimed in claim 7 further comprising a variable gap thrust bearing at an end distal from the base, the thrust bearing being defined by a gap between an axially facing surface of a hub and an opposing axially facing surface of a sleeve fluid in the gap supporting relative rotation of the hub and to the sleeve.

9. A fluid bearing as claimed in claim 8 further comprising a journal bearing defined by a gap in fluid communication with the gap of the thrust bearing, the gap of the journal bearing being defined by a radially facing surface of the sleeve and an opposing radially facing surface of the shaft, relative rotation of the shaft relative to the sleeve being supported by fluid in the journal bearing gap.

10. A fluid bearing system as claimed in claim 9 wherein the fluid journal bearing is closely adjacent the thrust bearing, and further comprising a seal defined between a generally radially facing surface of the hub and a generally radially facing surface of the sleeve, the surfaces diverging one from the other to establish a capillary seal roughly radially aligned with the journal and on an opposite side of the thrust bearing from the journal bearing.

11. A fluid bearing system as claimed in claim 9 wherein the sleeve supports the magnet and a second magnetic keeper which is radially adjacent the sleeve, the first magnetic keeper being supported from the sleeve and extending into axial alignment with the shaft so that a magnetic circuit is completed between the first and second magnetic circuit keepers and the magnet and the shaft in order to bias the magnetic shaft axially toward the base of the bearing system.

12. A fluid bearing system as claimed in claim 11 wherein the fluid changes in viscosity with change in temperature, and the magnetic bearing is axially aligned so that as the viscosity changes and the thrust gap changes, the fluid pressure in the thrust bearing is maintained substantially constant.

13. A fluid bearing system as claimed in claim 12 wherein as the viscosity of the fluid in the gap changes, the effective journal length of the bearing changes as the fluid moves away from the journal bearing and into the thrust bearing so that the pressure in the thrust bearing and journal bearing are substantially balanced.

14. In a disc drive comprising a housing including a base and a cover to define an enclosed space, a spindle motor comprising a sleeve defining a bore, a shaft supporting at one end a hub adapted to support one or more discs for constant speed rotation, fluid bearing means for the shaft supporting for rotation relative to the sleeve, and magnetic preload means for axially biasing the shaft relative to the sleeve to maintain substantially constant fluid pressure in the fluid bearing means with changes in viscosity of the fluid.

15. A disc drive as claimed in claim 14 wherein the shaft outer surface includes a generally conical surface facing an inner surface of the sleeve, the fluid bearing means including fluid in the gap defined by the generally conical surface.

16. A disc drive as claimed in claim 15 wherein the magnetic preload means comprises a magnet supported from the hub and a magnetic material supported by the base across a defined gap from the magnet.

17. A bearing as claimed in claim 5 wherein the shaft and sleeve further define a journal bearing, the journal bearing being defined by a set of grooves on one of the outer surface of the shaft or the inner surface of the sleeve and including fluid in a gap defined by an outer surface of the shaft and an inner surface of the sleeve.

18. A bearing as claimed in claim 17 further comprising a pin extending at least partially through the sleeve and cooperating with a recess in an outer surface of the shaft located between the conical bearing and the journal bearing to prevent excessive axial motion of the shaft relative to the sleeve.

19. A disc drive as claimed in claim 14 wherein the fluid bearing means comprises a journal bearing cooperating with a thrust bearing and defined between the shaft and the sleeve at one end of the shaft.

20. A disc drive as claimed in claim 19 wherein the magnetic preload means comprises a magnetic circuit aligned with an end of the shaft to axially bias the shaft and maintain fluid pressure in the fluid bearing means with changes in viscosity of fluid in the journal bearing and the thrust bearing.

21. A fluid bearing as claimed in claim 20 further comprising a journal bearing defined by a gap in fluid communication with the gap of the thrust bearing, the gap of the journal bearing being defined by a radially facing surface of the sleeve and an opposing radially facing surface of the shaft, relative rotation of the shaft relative to the sleeve being supported by fluid in the journal bearing gap.

* * * * *